(12) United States Patent
Li et al.

(10) Patent No.: US 9,130,944 B2
(45) Date of Patent: Sep. 8, 2015

(54) MECHANISM AND PROTOCOL TO AUTHORIZE BILATERAL SESSIONS BETWEEN WEBSITES BASED ON OPEN AUTHORIZATION

(71) Applicant: Futurewei Technologies, Inc., Plano, TX (US)

(72) Inventors: Li Li, Bridgewater, NJ (US); Wu Chou, Basking Ridge, NJ (US); Tao Cai, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 162 days.

(21) Appl. No.: 13/799,996

(22) Filed: Mar. 13, 2013

(65) Prior Publication Data

US 2014/0282881 A1    Sep. 18, 2014

(51) Int. Cl.
*H04L 29/06* (2006.01)

(52) U.S. Cl.
CPC .......... *H04L 63/10* (2013.01); *H04L 63/0807* (2013.01)

(58) Field of Classification Search
CPC ........................ H04L 63/10; H04L 63/0807
See application file for complete search history.

(56) References Cited

U.S. PATENT DOCUMENTS

| | | | | |
|---|---|---|---|---|
| 6,892,240 | B1 * | 5/2005 | Nakajima | 709/227 |
| 2007/0136359 | A1 * | 6/2007 | Iwahara et al. | 707/102 |
| 2008/0091763 | A1 * | 4/2008 | Devonshire et al. | 709/201 |
| 2010/0005297 | A1 * | 1/2010 | Ganesan | 713/169 |
| 2011/0085667 | A1 | 4/2011 | Berrios et al. | |
| 2011/0314388 | A1 * | 12/2011 | Wheatley | 715/751 |
| 2012/0331097 | A1 | 12/2012 | Menoher et al. | |
| 2014/0033279 | A1 * | 1/2014 | Nimashakavi et al. | 726/4 |
| 2014/0143836 | A1 * | 5/2014 | Fletcher et al. | 726/4 |

FOREIGN PATENT DOCUMENTS

CN    102123151 A    7/2011

OTHER PUBLICATIONS

Rescorla, "HTTP Over TLS," RFC 2818, May 2000, 7 pages.
Neuman, et al., "The Kerberos Network Authentication Service (V5)," RFC 4120, Jul. 2005, 138 pages.
Dierks, et al.,"The Transport Layer Security (TLS) Protocol Version 1.2," RFC 5246, 104 pages, Aug. 2008.
Hardt., Ed., "The OAuth 2.0 Authorization Framework," RFC 6749, Oct. 2012, 77 pages.
Hardt., Ed., "The OAuth 2.0 Authorization Framework," draft-ietf-oauth-v2-31, Jul. 31, 2012, 73 pages.
Foreign Communication From a Counterpart Application, PCT Application No. PCT/CN2014/073317, International Search Report dated Jul. 1, 2014, 7 pages.
Foreign Communication From a Counterpart Application, PCT Application No. PCT/CN2014/073317, Written Opinion dated Jul. 1, 2014, 4 pages.

* cited by examiner

*Primary Examiner* — Jung Kim
*Assistant Examiner* — Robert Leung
(74) *Attorney, Agent, or Firm* — Conley Rose, P.C.; Grant Rodolph; William H. Dietrich

(57) ABSTRACT

An apparatus for authorizing a bilateral session between two websites, comprising a processor configured to grant authorization for a first website to access a first resource located on a second website, grant authorization for the second website to access a second resource located on the first website, and establish the bilateral session between the first website and the second website when authorization is granted for the first website to access the first resource and authorization is granted for the second website to access the second resource, wherein the bilateral session supports the transfer of the first resource to the first website and the transfer of the second resource to the second website.

20 Claims, 9 Drawing Sheets

| 500 |
|---|
| Access request |
| 502 — grant_type = authorization_code |
| 402 — code = {code} |
| 506 — redirect_uri = {URI1} |
| 304 — client_id = {Id} |
| 510 — token_type=session |
| 512 — access_token={token_a1} |
| 514 — expires_in={xsd:duration|xsd:dateTime} |
| 516 — refresh_token={token_a2} |

*FIG. 5*

| 600 |
|---|
| Access response |
| 602 — access_token = {token_b1} |
| 510 — token_type = session |
| 606 — expires_in = {xsd:duration|xsd:dateTime} |
| 608 — refresh_token = {token_b2} |
| 308 — scope=session |

*FIG. 6*

MECHANISM AND PROTOCOL TO AUTHORIZE BILATERAL SESSIONS BETWEEN WEBSITES BASED ON OPEN AUTHORIZATION

CROSS-REFERENCE TO RELATED APPLICATIONS

Not applicable

STATEMENT REGARDING FEDERALLY SPONSORED RESEARCH OR DEVELOPMENT

Not applicable.

REFERENCE TO A MICROFICHE APPENDIX

Not applicable.

BACKGROUND

Web Real-Time Communication (WebRTC) is an application program interface (API) that provides a variety of resources, such as address book, voice calling, video chat, and peer-to-peer file sharing via a web browser. Without plug-ins, a web browser may support real-time communication using Javascript APIs and Hyper Text Markup Language (HTML). WebRTC applications and services may need bilateral sessions that allow resources on two different websites to access each other within one session. Bilateral sessions are also useful in non-real-time applications, such as electronic mail (email). For instance, a user may have two email accounts located on two different websites, such as a YAHOO email account and GMAIL email account. The user may login to the YAHOO email account to create a YAHOO login session to access emails stored in the YAHOO email account. In a bilateral session, the user may be able to obtain emails from the user's GMAIL email account and the user's GMAIL email account may also obtain emails from the YAHOO email account within the YAHOO login session. As a result, the bilateral session may allow both email accounts to share emails, files, pictures, and/or other forms of data between each other within one session. Bilateral sessions may also be useful in other WebRTC applications and services, such as presence federation and call routing that use resources located on different web servers.

Unfortunately, today's web infrastructure is configured to perform unilateral sessions where a resource in one website accesses a resource on another website within a session, but not vice versa. Using the email account example from above, a user may login to YAHOO email account to obtain emails from the YAHOO email account and the GMAIL email account. However, in a unilateral session, the GMAIL email account is unable to obtain emails from the YAHOO email account within the same YAHOO login session. Instead, the user would create a new session, such as opening a new web page, logging into the GMAIL email account, and authorizing the GMAIL email account to obtain emails from the YAHOO email account. Therefore, in a unilateral session, two different sessions may need to be created for two different websites to access each other resources.

One reason today's web infrastructure is limited to unilateral sessions is because of the current development of web authorization protocols, such as Open Authorization (OAuth) 2.0, Hypertext Transfer Protocol Secure (HTTPS), and Kerberos. Today's web authorization protocols have not been adapted to authenticate websites to share resources between each other. OAuth 2.0, as defined in the Internet Engineering Task Force (IETF) Request for Comments (RFC) 6749, published October 2012, which is incorporated herein as if reproduced by its entirety, supports unilateral sessions and not bilateral sessions. Furthermore, OAuth 2.0 provides authorization to a fixed list of resources and may not dynamically add and/or remove resources. HTTPS, as defined in the IETF RFC 2818, published May 2000, may be used between websites to perform certificate based mutual authentication such as Transport Layer Security (TLS) as defined in the IETF RFC 5246, published August 2008. Although HTTPS may provide mutual authorization between websites, HTTPS does not grant access to the resources on the websites. Kerberos, as defined in the IETF RFC 4120, published July 2005, is an authentication protocol that authenticates distributed computer processes. Kerberos may authorize a session between a client and a server, but does not permit bilateral sessions where the two servers in a session may access resources from each other. Therefore, to improve the WebRTC experience, a web authorization protocol is needed to support the establishment of bilateral sessions within a session.

SUMMARY

In one embodiment, the disclosure includes an apparatus for authorizing a bilateral session between two websites, comprising a processor configured to grant authorization for a first website to access a first resource located on a second website, grant authorization for the second website to access a second resource located on the first website, and establish the bilateral session between the first website and the second website when authorization is granted for the first website to access the first resource and authorization is granted for the second website to access the second resource, wherein the bilateral session supports the transfer of the first resource to the first website and the transfer of the second resource to the second website.

In yet another embodiment, the disclosure includes an apparatus for authorizing a bilateral session between two websites, comprising a processor configured to transmit an authorization request message to a first website, receive an authorization response message from the first website, establish the bilateral session between the first website and a second website using the authorization request and the authorization response, wherein the authorization request message identifies a list of resources located on the first website, and wherein the second website modifies the list of resources.

In yet another embodiment, the disclosure includes a method for authorizing a bilateral session between two websites using the OAuth, wherein the method comprises transmitting an authorization request message to a first website, receiving an authorization response message from the first website and forwarding the authorization response message to a second website, wherein the authorization request represents a request for the first website to grant access to a plurality of first resources located on the first website to the second website, wherein the authorization request authorizes the first website to access a plurality of second resources located on the second website, and wherein the authorization response message authorizes the first website to access the first resources.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a table describing the parameters of an embodiment of access request for an authorization code grant.

FIG. 6 is a table describing the parameters of an embodiment of access response message 600 for an authorization code grant.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein are a method, an apparatus, and a system that may be used to authorize a bilateral session between two websites based on OAuth 2.0. Parameters may be added to the OAuth 2.0 protocol to support a bilateral session between two websites hosted by two different end nodes. More specifically, the extension parameters may be added to OAuth 2.0 protocol messages such as the authorization request, authorization response message, access request, and access response messages generated during an OAuth 2.0 authorization process. The additional parameters may prevent the addition of protocol messages exchanged during the OAuth 2.0 authorization process. After authorization of the bilateral session between the two websites, each of the websites may access resources managed by the other website.

Figure 1:
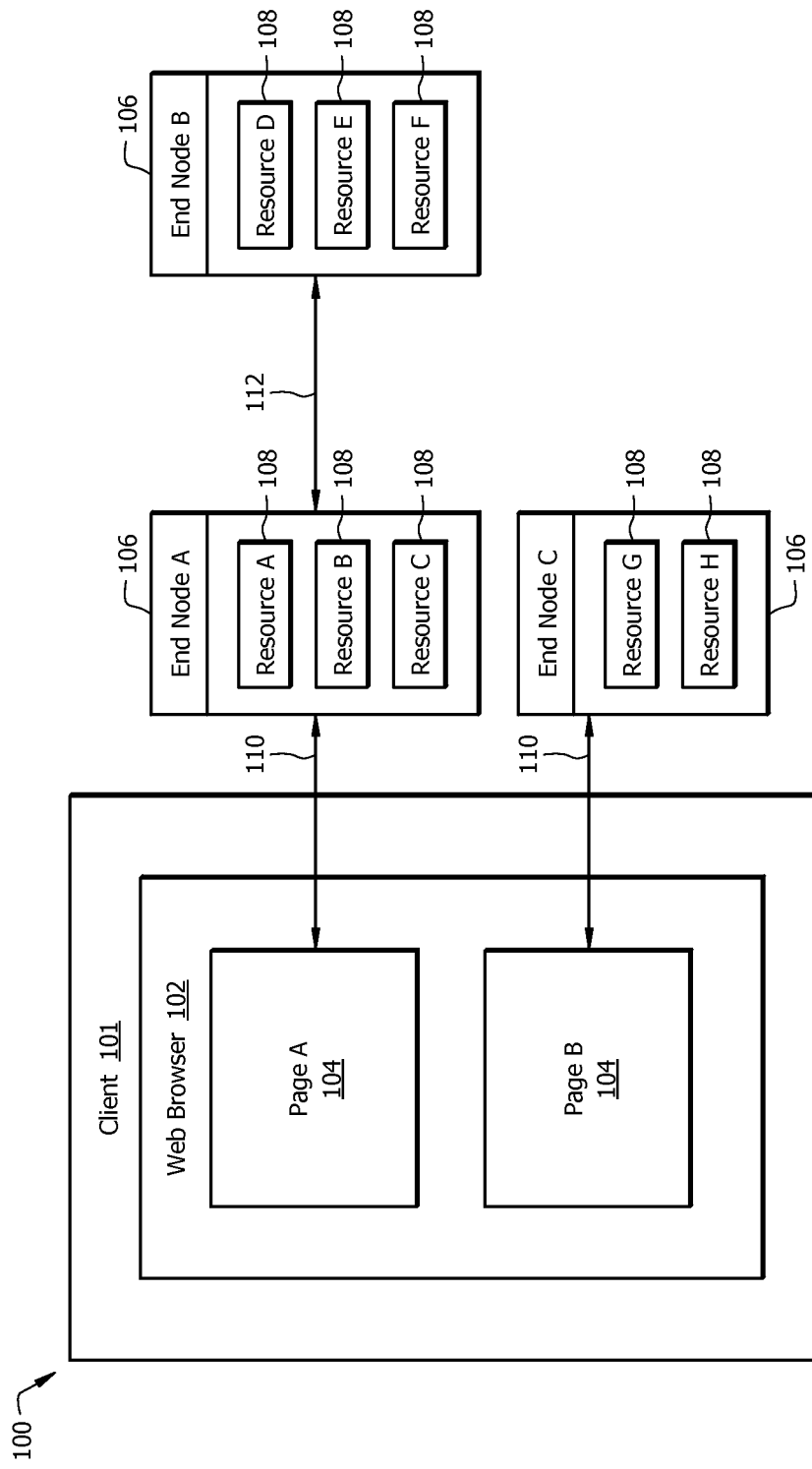
FIG. 1 is a schematic diagram of an embodiment of a system used to provide a bilateral session between two websites.

FIG. 1 is a schematic diagram of an embodiment of a system 100 used to provide a bilateral session between two websites. In one embodiment, system 100 may be based on the Representational State Transfer (REST) architecture, such as the World Wide Web. System 100 may comprise a client 101 and end nodes 106. Client 101 may encompass a variety of devices, such as personal computers, cellular phones, IP devices (e.g. tablets), video-audio devices (e.g. televisions), and/or any device capable of operating a web browser 102. The client 101 may comprise a local storage component not shown in FIG. 1 that may be used to save information relating to the resources accessed from end nodes 106. Client 101 may be configured to use a variety of input devices that include, but are not limited to a keyboard, mouse, touch screen and/or video imaging/conferencing equipment.

Client 101 may be configured to operate and display information within one or more web browsers 102. Users, such as a web user and/or a resource owner, may interact with the client 101 via the input devices to operate web browser 102. In one embodiment, web browser 102 may be any software application for retrieving, presenting, and traversing resources 108 from system 100, such as CHROME, FIREFOX, INTERNET EXPLORER, OPERA, and SAFARI. In one embodiment, web browser 102 may be configured to access, retrieve, and view documents, web applications and web services from the Internet. Some of these web services and web applications may include, but are not limited to voice calling, video chat, and peer-to-peer file sharing. The web browser 102 may be integrated with voice and video engines and configured to operate resources 108 without the installation of plug-ins and/or other add-ons. Web browser 102 may be stored in a memory component within the client 101. Moreover, the client 101 may comprise a processing unit (e.g. central processing unit (CPU)) that may be used to load web browser 102 within client 101 and execute web services and applications within web browser 102.

Web browser 102 may be configured to access one or more web pages 104 that may be encoded in HTML, extensible HTML (XHTML), or other forms of markup language. Web browser 102 may be able to view web pages 104, such as public websites and/or intranet websites. In FIG. 1, web page A 104 may display web information from a website hosted by end node A 106, while web page B 104 may display web information from a website hosted by end node B 106. Another embodiment of system 100 may have one of the end nodes 106 (e.g. end node A 106) host the websites displayed in both web pages A and B 104. Hosting of web page A 104 and web page B 104 may also be distributed amongst a plurality of end nodes 106.

End nodes 106 may include, but are not limited to servers, hosts, storage devices and/or any combination of devices that may be configured to implement the OAuth protocol. End nodes 106 may transmit and receive data from client 101. In one embodiment, end nodes 106 may be one or more web servers implemented in a variety of method, such as Java, C++, and/or other web server framework. End nodes 106 may be used to host websites that can be accessed publicly (e.g. over the Internet) and/or through a private network (e.g. virtual private network).

End node 106 may comprise one or more resources 108. Resources 108 may be video data, audio data, text data, and any other types of data that may be displayed and/or executed within web browser 102. For example, when a video chat is performed within web browser 102, resources 108 may be video and audio data. Other embodiments of resource 108 may include address books, phone applications, presence distributed on different websites during a presence federation call, or any two-way real-time web applications (e.g. video chatting and peer-to-peer file sharing). Resources 108 may be stored on one or more end nodes 106 and may be distributed remotely on different web services. FIG. 1 illustrates that resources A-C 108 may be stored within end node A 106; resources D-F 108 may be stored within end node B 106, and resource G and H 108 may be stored within end node C 108. In one embodiment, resource 108 may be protected or access-restricted and may be accessed after proper authorization from a user.

In FIG. 1, the web browser 102 may establish a session 110 between two different websites hosted by end nodes A and C 106. Within session 110, the web browser 102 may be able to access resources A-C, G, and H 106. Session 110 may be authenticated using any version of the OAuth protocol, such as OAuth 2.0 as defined in the IETF RFC 6749. For example, a user may access a web page via the web browser 102. The web page A 104 may display a website that may prompt the user to enter a username and password in a username field and password field. After the user enters the username and password, the request to access resources A-C may be sent to end node A 106. Once end node A 106 receives the request, end node A 106 may authenticate the client 101 and web browser 102 to establish session 110.

FIG. 1 also illustrates that a bilateral session 112 may be established between end nodes A and B 106 after a user authorizes each end node 106 to access the resources from the other end node 106. In other words, end node A 106 and end node B 106 may access resources managed by the other end node 106 within bilateral session 112. For example, end node A 106 may be able to access resource D 108 located in end node B 106, while end node B 106 may be able to access resource A located in end node A 106. The authenticating process for a bilateral session 112 will be discussed in more detail below.

Figure 2A:
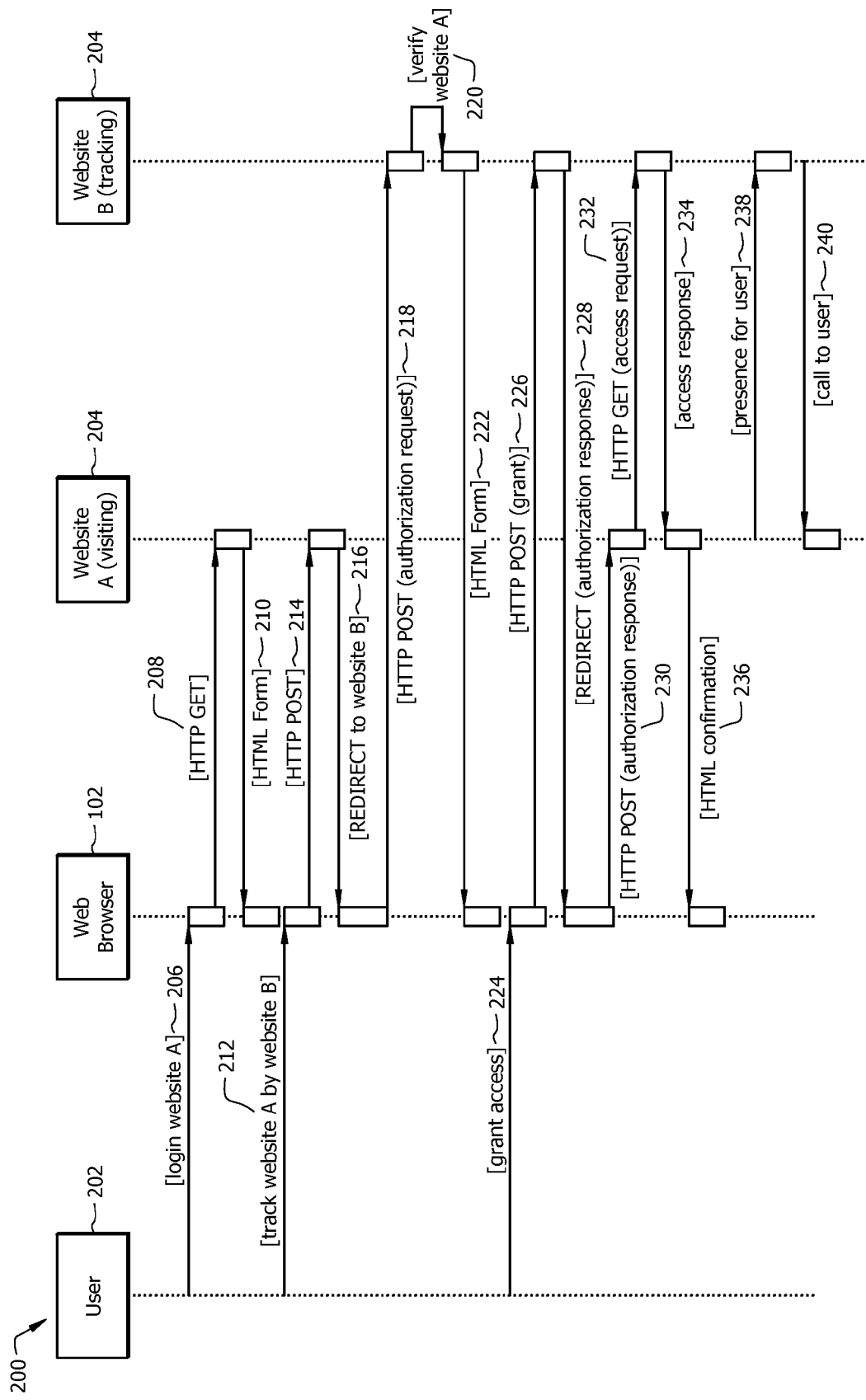
FIG. 2A is a protocol diagram of an embodiment of a message exchange process for authorizing a bilateral session between two websites using an authorization code grant.

FIG. 2A is a protocol diagram of an embodiment of a message exchange process 200 for authorizing a bilateral session between two websites using an authorization code grant. More specifically, FIG. 2A illustrates the messages exchanged between a user 202, web browser 102, and websites A and B 204 over a HTTP protocol. User 202 may include the resource owner or any other entity privy to the information to access resources on websites A and B 204. A resource owner may be any entity capable of granting access to a protected resource. For example, a person may be the resource owner of pictures that are password protected and stored on a website. To access the pictures, the person may need to provide the password in order to access the pictures on the website. Websites A and B 204 may be hosted by a plurality of end nodes 106 and may be displayed as a web page within web browser 102 as shown in FIG. 1. In FIG. 2A, web browser 102 may act as the client that performs the resource requests on behalf of user 202.

The message exchange process 200 starts when a user 202 attempts to login to website A 204 via a web browser 102. In the login process, user 202 may provide authentication information and/or perform actions such as clicking on one or more hyperlinks and/or entering a string of characters to navigate to website A 204 via web browser 102. Once the user 202 provides the proper information to navigate to website A 204 to access resources in website A 204, a login site A message 206 may be sent to the web browser 102. In one embodiment, user 202 may enter a string of characters into a username field and a password field displayed within the web browser 102 to produce login website A message 206. The login website A message 206 may be one or more messages generated internally within a client. After web browser 102 receives the login website A message 206, the web browser 102 may produce a Hypertext Transfer Protocol (HTTP) Get message 208 as described in IETF RFC 2616, published June 1999, which is incorporated herein as if reproduced by its entirety. The HTTP Get message 208 may request to retrieve website information and access resources (e.g. access tokens) in website A 204 based on the information provided in the login website A message 206. Once website A 204 authenticates the information, website A 204 may send a HTML Form message 210. The HTML Form message 210 may include data used to produce a web page that a user 202 may be able to view within web browser 102 after website A authenticates the information sent in the HTTP Get message 208. HTML Form message 210 may also provide resource data requested in the HTTP Get message 208.

After logging into website A 204, user 202 may then want website A 204 to access the user's 202 resources located on website B 204 and website B 204 to access the user's 202 resources located on website A 204. In one embodiment, user 202 may send a "track website A by website B" request 212 for website A to access resources in website B 204, and vice versa. FIG. 2A illustrates that website A 204 may be labeled the visiting website while website B 204 may be labeled the tracking website. Through tracking, website A 204 may send messages to website B 204 that notifies website B 204 of the user's presence. User 202 may click on one or more hyperlinks, enter a string of characters, and/or use other methods to navigate through website A within web browser 102 to produce the "track website A by website B" request 212. Similar to the login website A message 206, the "track website A by website B" request 212 may be one or more internal messages produced within the client.

Once web browser 102 receives the "track website A by website B" request 212, the web browser 102 may send a HTTP Post message 214, as described in IETF RFC 2616, published June 1999, to website A 204. The HTTP Post message 214 may be a request for website A 204 to gain access to resources in website B 204 and for website A 204 to provide access to resources on website A 204 to website B 204. When website A 204 receives the HTTP Post message 214, website A 204 may send a redirect to website B message 216 back to web browser 102. Currently, website A 204 may not have authorization to access resources in website B 204 and website B 204 may not have authorization to access resources in website A 204. To obtain the proper authorization, website A 204 may use the redirect to website B message 216 to redirect web browser 102 to website B 204. The redirect to website B message 216 may comprise a uniform resource identifier (URI) that identifies website B 204. Once web browser 102 receives the redirect to website B message 216, the web browser 102 processes the redirect to website B message 216 and loads a web page displaying website B 204. In one embodiment, the web page may have been displaying website A 204 prior to receiving the redirect to website B message 216.

Web browser 102 may then send a HTTP Post authorization request 218 to website B 204. The HTTP Post authorization request 218 may send a set of parameters, such as a client identifier (ID), redirection URI, and a list of resource user 202 may want to access on website B. The HTTP Post authorization request 218 may indicate a request on behalf of user 202 for website A 204 to obtain authorization to access resources on website B 204, and for website B 204 to access resources on website A 204. After website B 204 receives the HTTP Post authorization request 218, website B 204 may produce a "verify website A" message 220 to determine whether website A 204 matches the redirection URI sent in the HTTP Post authorization request 218. The redirection URI may be used to redirect access tokens to website A 204 instead of web browser 102. Moreover, website B 204 may determine whether the parameters within the HTTP Post authorization request 218 are valid. The "verify website A" message 220 may be generated within the one or more end nodes that host website B 204. The HTTP Post authorization request 218 for an authorization code grant will be discussed in more detail in FIG. 3.

After verification of HTTP Post authorization request 218, website B 204 may send a HTML form message 222 that may include data used to produce a web page that corresponds to website B 204. The HTML form message 222 may provide the web page data so that a user 202 may be able to view the web page within web browser 102. The HTML form message 222 may include data to construct a field for user 202 to enter private information, such as a username and password. When web browser 102 receives HTML form message 222, web browser 102 displays website B 204 within a web page. Afterwards, user 202 may enter private and/or secret information (e.g. username and password) to provide access to resources on website B. Once user 202 provides the private information, a grant access message or action 224 may be generated within the client and sent to web browser 102. In one embodiment, the grant access action 224 may be realized by user 202 clicking an appropriate button on web browser 102.

When web browser 102 receives the grant access message 224, the web browser 102 may transmit an HTTP Post grant message 226 to website B 204. The HTTP Post grant message 206 may represent user's 202 authorization for website B 204 to grant resource access to website A 204 and vice versa. For FIG. 2A, HTTP Post grant message 226 may be an authorization grant. Other types of grants, such as the implicit grant, resource owner password credential grant, or a client credential grant will be discussed in FIG. 2B. The type of HTTP Post grant message 226 may depend on the type of HTTP Post authorization request 218 sent to website B 204.

After receiving the HTTP Post grant message 226, website B 204 may send a redirect authorization response message 228 back to web browser 102 that indicates that website B 204 has received and verified the HTTP Post grant message 226. Additionally, the redirect authorization response message 228 may redirect the web browser 102 to display a webpage corresponding to website A 204. In FIG. 2A, the redirect authorization response message 228 may be for an authorization code grant, and will be discussed in more detail in FIG. 4. Web browser 102 may subsequently forward the received redirect authorization response message 228 as an HTTP Post authorization response message 230 to website A. The HTTP Post authorization response message 230 may indicate website A 204 has authorization to access resources on website B 204 and website B has authorization to access resources on website A 204.

To obtain resources from website B 204, website A 204 may request for access tokens using an HTTP Get access request 232. The access tokens may comprise a token ID that may be a string of characters that identifies tokens that correspond to resources in website B 204. The access tokens may grant access to one or more resources on website B 204 for website A 204. In one embodiment, the string of characters may not represent the actual username and/or passwords entered by user 202, and may be a different set of characters. The HTTP Get access request 232 may also issue access tokens to website B 204 to access resources on website A 204.

When website B 204 receives the HTTP Get access request 232, website B 204 may send an access response message 234 that issues access tokens to website A 204 after verifying the HTTP Get access request 232 is valid. The HTTP Get access request 232 and access response message 234 will be described in more detail in FIGS. 5 and 6.

Website A 204 may then send a Hyper Text Markup Language (HTML) confirmation message 236 to web browser 102. The HTML confirmation message 236 may indicate that website A may now access resources on website B 204 and website B 204 access resources on website A 204. When web browser 102 receives the HTML confirmation message 236, the web browser 102 may display a message within a web page that notifies the user 202 of the establishment of the bilateral session between website A 204 and website B 204. To access resources, website A 204 may send a presence for user message 238 to website B 204 that includes the access tokens received from website B 204. The access tokens may be used to access the resources on website B 204. The presence for user message 238 may also indicate the user's 202 desire and instructions to obtain the resources from website B 204. When a user desires website B 204 from resource in website A 204, website B 204 may send a call to user message 240 to access resources in website A 204. The call to user message 240 may include access tokens that correspond to resources located in website A 204.

Figure 2B:
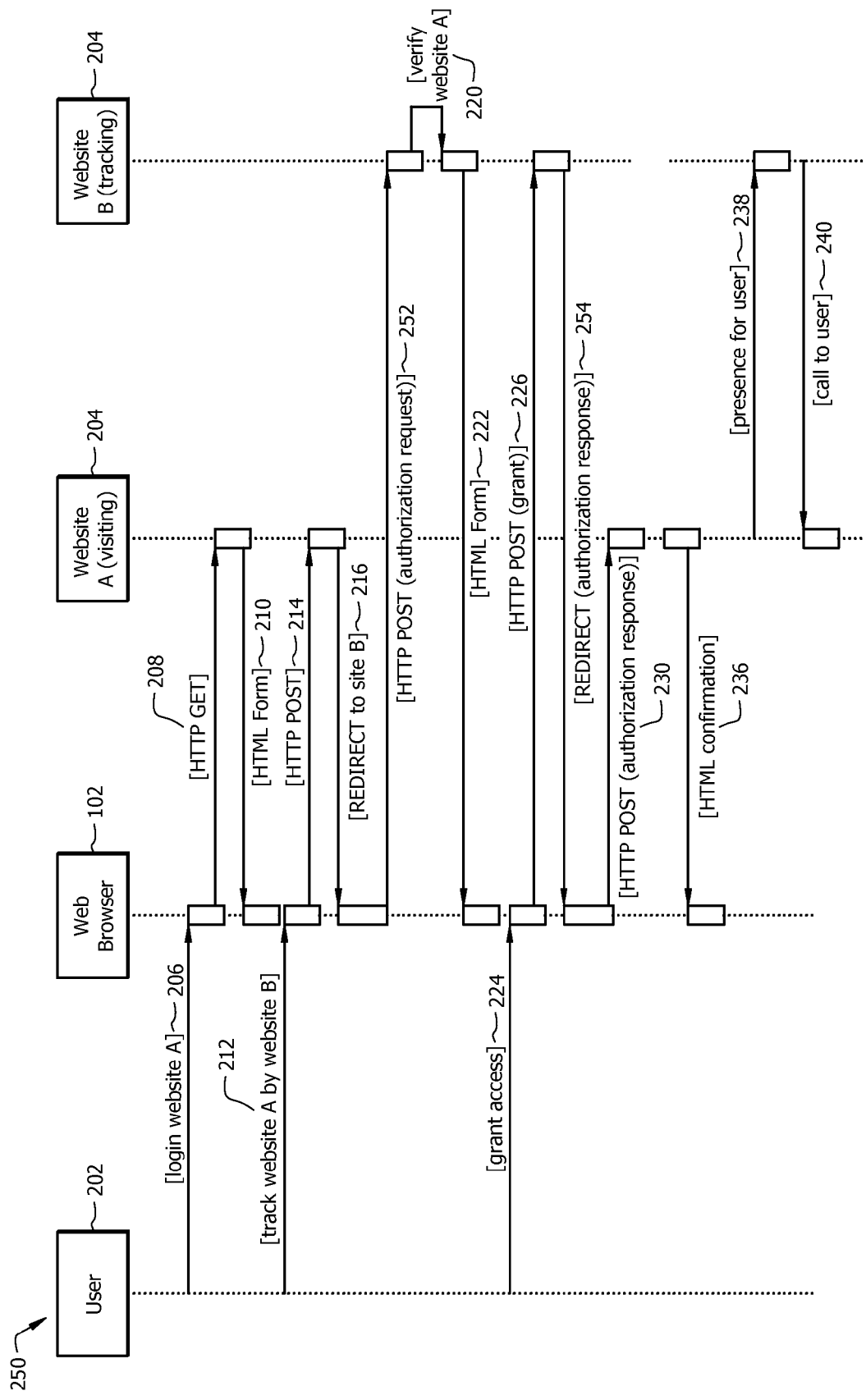
FIG. 2B is a protocol diagram of another embodiment of a message exchange process for authorizing a bilateral session between two websites using implicit grant, resource owner password credential grant, or a client credential grant.

FIG. 2B is a protocol diagram of another embodiment of a message exchange process 250 for authorizing a bilateral session between two websites using implicit grant, resource owner password credential grant, or a client credential grant. The message exchange process 250 is substantially similar to the message exchange process 200 in FIG. 2A except that the HTTP Get access request 232 and the access response message 234 may not be transmitted within message exchange process 250. More specifically, website A 204 in FIG. 2B does not transmit the HTTP Get access request 232 and website B 204 does not transmit the access response message 234 to obtain access tokens for both websites. Instead, the access tokens to access resources on website A 204 may be issued to website B 204 in the HTTP Post authorization request 252, and access tokens to access resources on website B 204 may be issued to website A 204 in the authorization response message 254. The HTTP Post authorization request 252 and redirect authorization response message 254 will be discussed in more detail in FIGS. 7-12.

Figure 3:
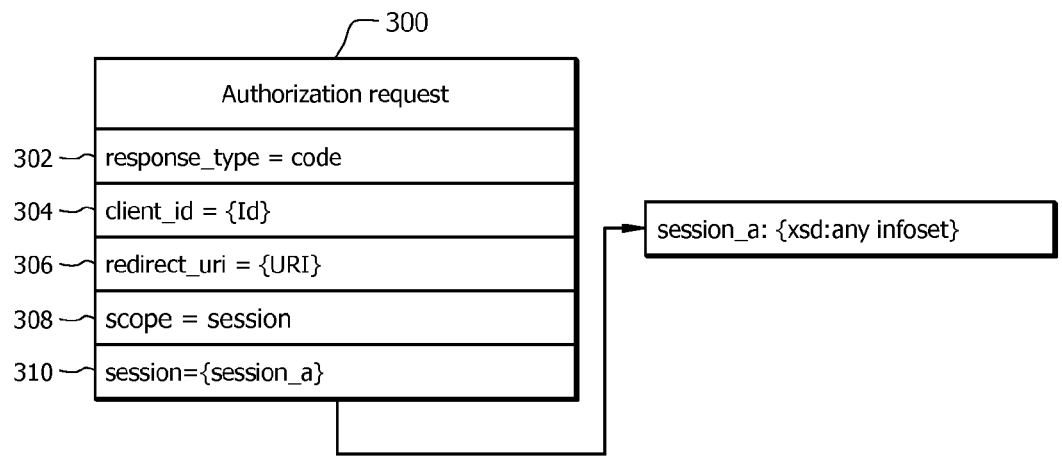
FIG. 3 is a table describing the parameters of an embodiment of an authorization request for an authorization code grant.

FIG. 3 is a table describing the parameters of an embodiment of an authorization request 300 for an authorization code grant. The authorization request 300 may be encoded as a HTTP protocol, and the parameters may be encoded as key and value attributes. The authorization request 300 may be the HTTP Post authorization request 218 shown in FIG. 2A. Authorization request 300 may comprise a response type parameter 302, a client_ID parameter 304, a redirect_URI parameter 306, a scope parameter 308, and a session parameter 310. The response type parameter 302 may indicate the desired grant type. For example, OAuth 2.0 may define four different grant types: authorization code, implicit, resource owner password credentials, and client credentials. When the response type parameter 302 equals the value of "code," then the authorization request 300 may be used to request for an authorization code. The client_ID parameter 304 may indicate the registration information used to identify the client. The "{ID}" value may be a unique string of characters, and may not be secret or private information, and may be exposed to a user. Using FIG. 2A as an example, the client_ID parameter 304 may be used to identify website A 204. The redirect_URI parameter 306 may indicate the URI to which an authorization response message (e.g. redirect authorization response 254) may be sent. In one embodiment, the "{URI}" value may be a string of characters that forms an address for a web page or the address of the client. Using FIG. 2A as an example, the "{URI}" value may be the URI of website A 204. The scope parameter 308 may specify the scope of the access request. When the scope parameter 308 equals a "session" value, the scope parameter 308 may reference the type of resource that will be accessed within the bilateral session.

The session parameter 310 may indicate a session ID and the references that will be accessed within the bilateral session. The value "{session_a}" may represent the value of the session ID. A session ID may be used to represent instances when the website sending the authorization request 300 is accessing resources on the website receiving the authorization request 300. For example, in FIG. 2A, the session ID with a value of "{ session_a}" may represent the instances when website A 204 accesses resources from website B 204. The value of "{session_a}" may be encoded as Extensible Markup Language (XML) such as XML Schema Definition (XSD). "xsd: any infoset" represents that "{session_a}" may be encoded as any data structure that indicates the resources that may be accessed during the bilateral session. For example the "xsd: any infoset" may indicate that a user's calendar, address book, and/or video encoded using a certain codec may be accessed in the bilateral session. The resources identified in the value of "{session_a}" may be modified and may not be a fixed list of resources.

Figure 4:
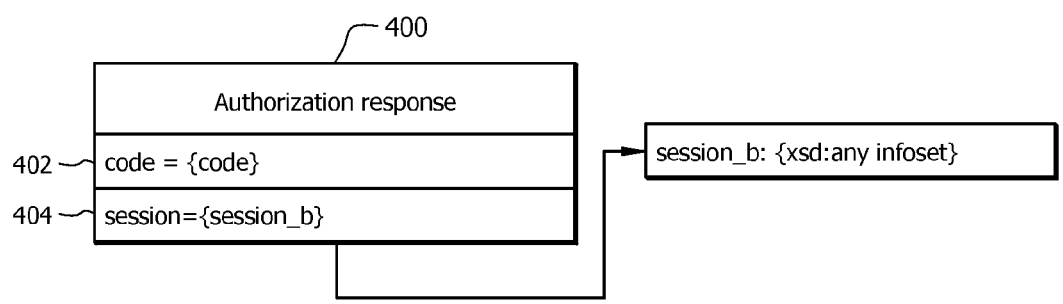
FIG. 4 is a table describing the parameters of an embodiment of authorization response message for an authorization code grant.

FIG. 4 is a table describing the parameters of an embodiment of authorization response message 400 for an authorization code grant. Similar to the authorization request 300 in FIG. 3, redirect authorization response message 400 may be encoded as a HTTP protocol and the parameters may be encoded as key and value attributes. Authorization response message 400 may be the redirect authorization response message 228 as shown in FIG. 2A. Recall that in FIG. 2A, the redirect authorization response message 228 may be sent from website B 204 (e.g. tracking website) to website A 204 (e.g. visiting website).

The authorization response message 400 may comprise a code parameter 402 and a session parameter 404. The code parameter 402 may represent the authorization to access resources in the website that transmits the authorization response message 400. The website may transmit the authorization response message 400 after a user grants the authorization request. The "{code}" value may be the actual code generated by the website that authorizes another website to access resources. For example, in FIG. 2A, after receiving the HTTP Post grant message 226 from the web browser 102, website B 204 may generate the "{code}" value, which may be used by website A 204 to represent website A 204 has authorization to access resources on website B 204. The session parameter 404 may be substantially similar to the session parameter 310 in FIG. 3 except that session parameter 404 has a value of "{session_b}." The value of "{session_b}" may identify the instances used to access resources from the website that sent the authorization request. For example, in FIG. 2A, the session ID with a value of "{session_b}" may represent the instances when website B 204 accesses resources from website A 204. Similar to the value of "{session_a}" shown in FIG. 3, "{session_b}" may be encoded as a data structure in XML that indicates the resources that may be accessed during the bilateral session.

FIG. 5 is a table describing the parameters of an embodiment of access request 500 for an authorization code grant. The access request 500 may be encoded as a HTTP protocol, and the parameters may be encoded as key and value attributes. The access request 500 may be substantially similar to the HTTP Get access request 232 shown in FIG. 2A. The access request 500 may issue access tokens for the website transmitting the access request 500, and request access tokens from the website that receives the access request 500. Access request 500 may comprise a grant_type parameter 502, a code parameter 402, a redirect_URI parameter 506, a client_ID parameter 304, a token_type parameter 510, a access_token parameter 512, a expires_in parameter 514, and a refresh_token parameter 516. The grant_type parameter 502 indicate the type of grant used to access resources on a website. In access request 500, the grant_type parameter may have a value of "authorization_code" that indicates the type of grant is an authorization code grant. The redirect_URI parameter 506 maybe identical to the redirect_URI parameter 306 if the redirect_URI parameter 506 is present within the access grant 500. FIG. 5 illustrates that redirect_URI parameter 506 may have a value of "{ URI1}." Using FIG. 2A as an example, the "{URI1}" value may represent the URI address of website A 204. Code parameter 402 and client_ID parameter 304 have been discussed above in FIGS. 3 and 4.

The token_type 510 parameter may indicate the type of access tokens that are being issued. The value of "session" indicates that the access tokens may be used to access resources within a website for the bilateral session. The access_token parameter 512 may include the access tokens used to access resources for the website transmitting the access request 500. The value "{ token_a1}" may represent the actual access tokens sent to the other website. In FIG. 2A, website A 204 HTTP Get access request 232 issues access tokens that access resources in website A 204 to website B 204. The expires_in parameter 514 indicates when the access tokens expire and are no longer valid to access resources on the website transmitting the access request 500. The value "{xsd:duration|xsd:dateTime}" may represent the duration of time or the absolute time point the access tokens may be valid. The duration of time may be represented in seconds, minutes, hours, or longer periods of time. After the duration of time has elapsed, the access tokens may no longer be valid. The absolute time point may be represented as a date and time of day. After time has elapsed beyond the absolute time point, the access tokens may no longer be valid. The refresh_token parameter 516 provides refresh tokens that may be used to access resources on the website transmitting the access request 500 once the access tokens have expired or are no longer valid. The value "{ token_a2}" may represent that the refresh tokens and access tokens in access_token parameter 512 may have different values. Refresh tokens may be used to prevent re-authorizing the bilateral session between two websites after a certain amount of time has elapsed since the initial authorization of the bilateral session.

FIG. 6 is a table describing the parameters of an embodiment of access response message 600 for an authorization code grant. The access response 600 may be encoded as a HTTP protocol, and the parameters may be encoded as key and value attributes. The access response 600 may be substantially similar to the access response message 234 shown in FIG. 2A, and may be used to issue access tokens to access resources on the website that transmits access response 600. Access response 600 may comprise a access_token parameter 602, a token_type parameter 510, a expires_in parameter 606, a referesh_token parameter 608, and a scope parameter 308. The token_type parameter 510 and scope parameter 308 have been discussed above.

The access_token parameter 602 may be substantially similar to access_token parameter 512 in FIG. 5, except that access_token parameter 602 has a value of "{token_b1}." The value of "{token_b1}" represents the access tokens for the website that transmits access response 600 and previously received the access request 500 shown in FIG. 5. In FIG. 2A, the value of "{token_b1}" may represent the access tokens to access resources on website B 204. The expires_in parameter 606 may be substantially similar to expires_in parameter 514 shown in FIG. 5 except that the expires_in parameter 606 may correspond to the access tokens issued in access_token parameter 602. The refresh_token parameter 608 may be substantially similar to refresh_token parameter 516 except that refresh_token parameter 608 has a value of "{token_b2}." The value of "{token_b2}" may differ from "{token_a1}," "{token_a2}," and "{token_b1}."

Figure 7:
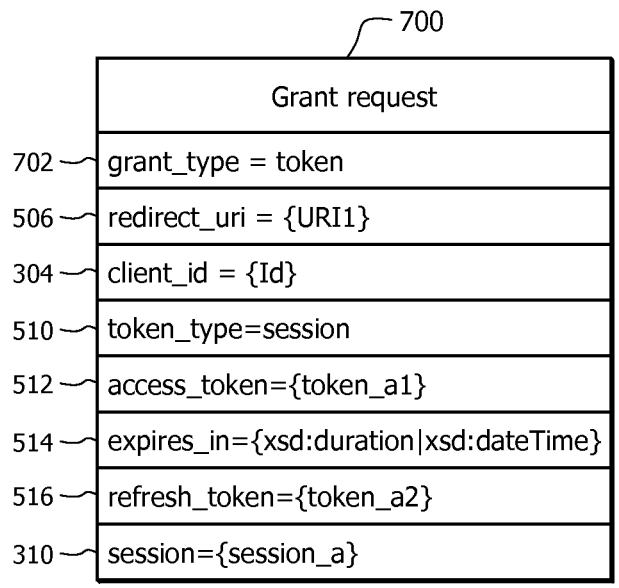
FIG. 7 is a table describing the parameters of an embodiment of authorization request 700 for an implicit grant.

FIG. 7 is a table describing the parameters of an embodiment of authorization request 700 for an implicit grant. In one embodiment, an implicit grant may be implemented in a web browser that uses a scripting language such as JavaScript. Instead of issuing an authorization code, an access token may be issued directly as the result of the resource owner authorization. The grant type is implicit, and thus no intermediate credentials, such as an authorization code may be issued and later used to obtain an access token. In one embodiment, a website may authenticate the other website when the website issues an access token during the implicit grant. The implicit grant may improve the responsiveness and efficiency of some clients because the implicit grant may reduce the number of round trips to obtain an access token. However, web security may suffer when implementing an implicit grant authorization.

The authorization request 700 may be encoded as a HTTP protocol, and the parameters may be encoded as key and value attributes. The authorization request 700 may be the HTTP Post authorization request 252 shown in FIG. 2B. The authorization request 700 may provide access tokens to access resources for the website transmitting the authorization request 700. The authorization request 700 may comprise a grant_type parameter 702, a redirect_URI parameter 506, a client_ID parameter 304, a token_type parameter 510, a access_token parameter 512, a expires_in parameter 514, a refresh_token parameter 516, and a session parameter 310. The grant_type parameter 702 may be substantially similar to the grant_type parameter 502 except that the grant_type parameter 702 may have a value of "token." The value of "token" indicates that authorization request 700 is an implicit type of grant. The redirect_URI parameter 506, client_ID parameter 304, token_type parameter 510, access_token parameter 512, expires_in parameter 514, refresh_token parameter 516, and session parameter 310 have been discussed above.

Figure 8:
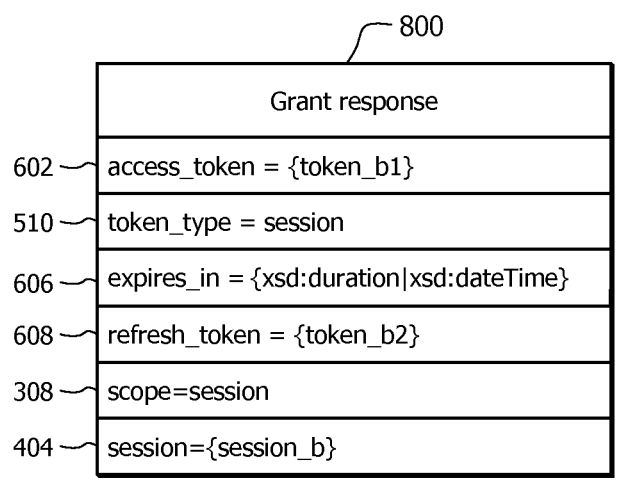
FIG. 8 is a table describing the parameters of an embodiment of authorization response 800 for an implicit grant.

FIG. 8 is a table describing the parameters of an embodiment of authorization response 800 for an implicit grant. The authorization response 800 may be encoded as a HTTP protocol, and the parameters may be encoded as key and value attributes. The authorization response 800 may be the redirect authorization response 254 shown in FIG. 2B and may be used to issue access tokens to access resources on the website that transmits authorization response 800. Authorization response 800 may comprise an access_token parameter 602, a token_type parameter 510, an expires_in parameter 606, a referesh_token parameter 608, a scope parameter 308, and session parameter 404, all of which have been discussed above.

Figure 9:
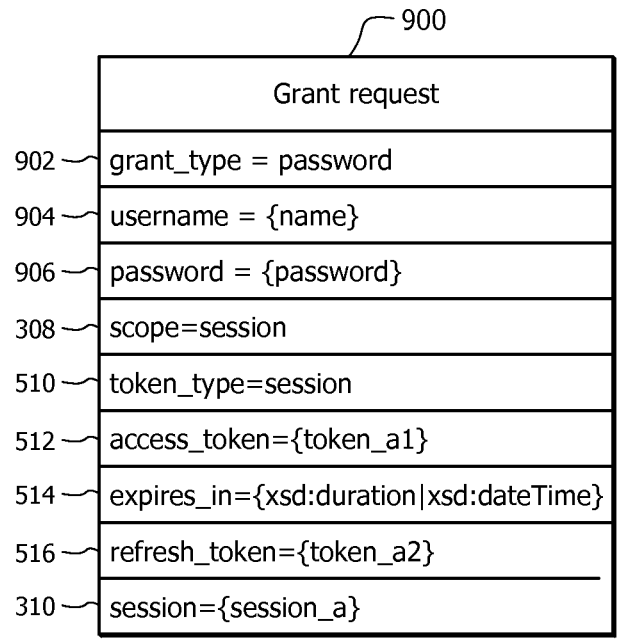
FIG. 9 is a table describing the parameters of an embodiment of authorization request for a resource owner password credential grant.

FIG. 9 is a table describing the parameters of an embodiment of authorization request 900 for a resource owner password credential grant. The authorization request 900 may include the resource owner password credentials such as a username and a password that may be used directly as an authorization grant to obtain one or more access tokens. The credentials may be used when there is a high degree of trust between the resource owner and the client and when other authorization grant types are not available (such as an authorization code). In one embodiment, the resource owner credentials may be used for a single request and may be exchanged for a single access token. To prevent storing the resource owner credentials for future use, a client may also exchange the resource owner credentials with a long-lived access token or refresh token.

The authorization request 900 may be encoded as a HTTP protocol, and the parameters may be encoded as key and value attributes. Using FIG. 2B as an example, the authorization request 900 may be the HTTP Post authorization request 252. The authorization request 900 may comprise a grant_type parameter 902, a username parameter 904, a password parameter 906, a scope parameter 308, a token_type parameter 510, a access_token parameter 512, a expires_in parameter 514, a refresh_token parameter 516, and a session parameter 310. The grant_type parameter 902 may be substantially similar to the grant_type parameter 702 shown in FIG. 7 except that grant_type parameter 902 may have a value of "password." The value of "password" indicates that the authorization request 900 may be for a resource owner password credential grant. The username parameter 904 may indicate the user's username. The value "{name}" may represent the actual username. The password parameter 906 may indicate the user's password. The value "{password}" may represent the actual password. All other parameters for the authorization request 900 have been discussed above.

Figure 10:
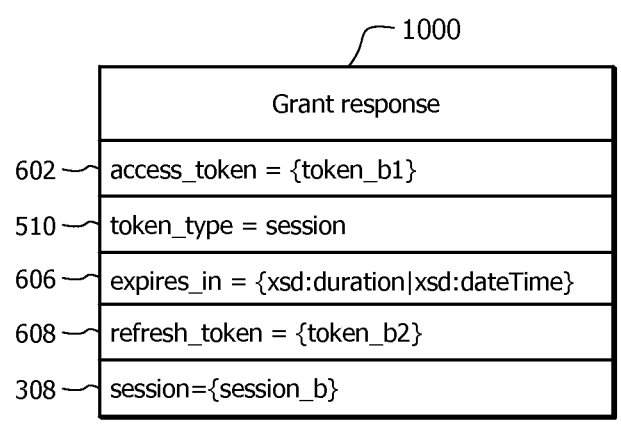
FIG. 10 is a table describing the parameters of an embodiment of authorization response for a resource owner password credential grant.

FIG. 10 is a table describing the parameters of an embodiment of authorization response 1000 for a resource owner password credential grant. The authorization response 1000 may be encoded as a HTTP protocol, and the parameters may be encoded as key and value attributes. The authorization response 1000 may be the redirect authorization response 254 shown in FIG. 2B and may be used to issue access tokens to access resources on the website that transmits authorization response 800. The authorization response 1000 may be substantially similar to the access response 600 shown in FIG. 6.

Figure 11:
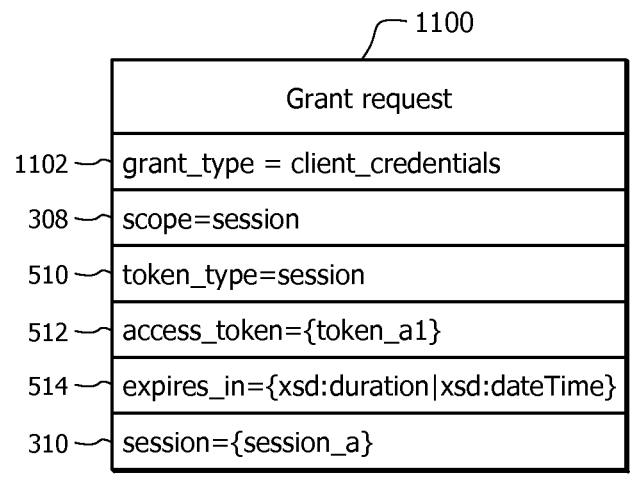
FIG. 11 is a table describing the parameters of an embodiment of authorization request for a client credential grant.

FIG. 11 is a table describing the parameters of an embodiment of authorization request 1100 for a client credential grant. A client credential grant may be used when the client is confidential. The client credential grant may use client credentials or other forms of client authentication to be used as an authorization grant. The scope of the client credential grant may be limited to the protected resources under the control of the client or to protected resources previously arranged with a website. Client credentials may be typically used as an authorization grant when the client is acting on its own behalf (e.g. the client is also the resource owner) or is requesting access to protected resources based on an authorization previously arranged with the website.

The authorization request 1100 may be encoded as a HTTP protocol, and the parameters may be encoded as key and value attributes. Using FIG. 2B as an example, the authorization request 1100 may be the HTTP Post authorization request 252. The authorization request 1100 may comprise a grant_type parameter 1102, a scope parameter 308, a token_type parameter 510, an access_token parameter 512, an expires_in parameter 514, and a session parameter 310, all which have been discussed above.

Figure 12:
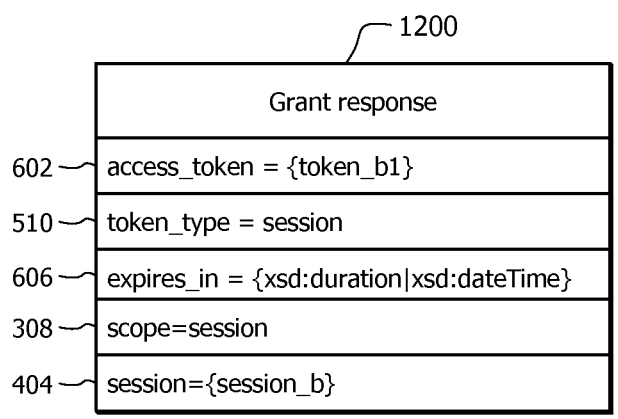
FIG. 12 is a table describing the parameters of an embodiment of authorization response for a client credential grant.

FIG. 12 is a table describing the parameters of an embodiment of authorization response 1200 for a client credential grant. The authorization response 1200 may be encoded as a HTTP protocol, and the parameters may be encoded as key and value attributes. The authorization response 1200 may be the redirect authorization response 254 shown in FIG. 2B and may be used to issue access tokens to access resources on the website that transmits authorization response 1200. The authorization response 1200 may be substantially similar to the authorization response 800 shown in FIG. 8.

Figure 13:
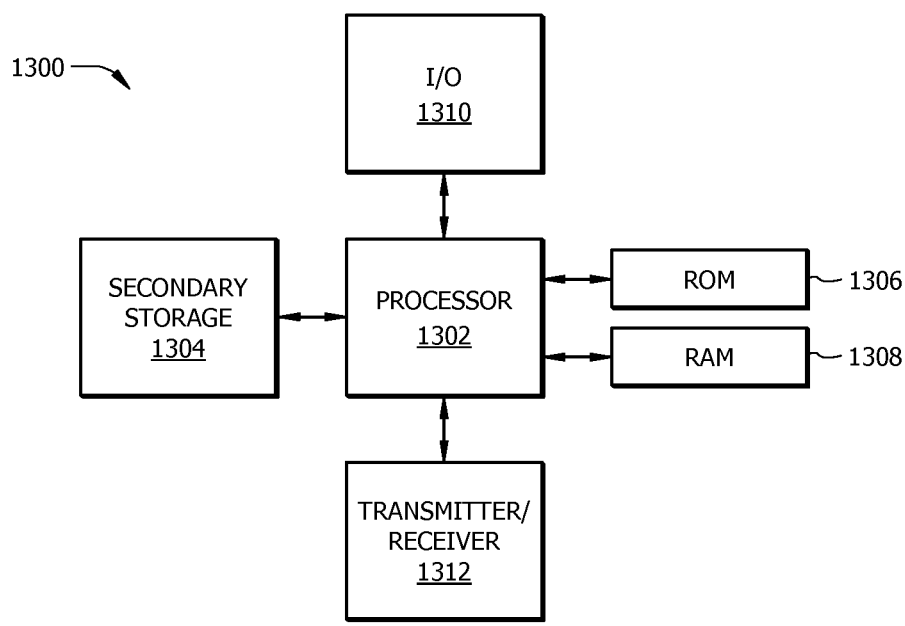
FIG. 13 is a schematic diagram of one embodiment of a general-purpose computer system suitable for implementing the several embodiments of the disclosure.

The schemes described above may be implemented on any general-purpose computer system, such as a computer or network component with sufficient processing power, memory resources, and network throughput capability to handle the necessary workload placed upon it. FIG. 13 illustrates a schematic diagram of a general-purpose computer system 1300 suitable for implementing one or more embodiments of the methods disclosed herein, such as the client 101, web browser 102, and end nodes 106. The computer system 1300 includes a processor 1302 (which may be referred to as a CPU) that is in communication with memory devices including secondary storage 1304, read only memory (ROM) 1306, random access memory (RAM) 1308, transmitter/receiver 1312, and input/output (I/O) device 1310. Although illustrated as a single processor, the processor 1302 is not so limited and may comprise multiple processors. The processor 1302 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1302 may be configured to implement any of the schemes described herein, such as the client 101, web browser 102, and end nodes 106. The processor 1302 may be implemented using hardware, software, or both.

The secondary storage 1304 is typically comprised of one or more disk drives or tape drives and is used for non-volatile storage of data and as an over-flow data storage device if the RAM 1308 is not large enough to hold all working data. The secondary storage 1304 may be used to store programs that are loaded into the RAM 1308 when such programs are selected for execution. The ROM 1306 is used to store instructions and perhaps data that are read during program execution. The ROM 1306 is a non-volatile memory device that typically has a small memory capacity relative to the larger memory capacity of the secondary storage 1304. The RAM 1308 is used to store volatile data and perhaps to store instructions. Access to both the ROM 1306 and the RAM 1308 is typically faster than to the secondary storage 1304. The secondary storage 1304, ROM 1306, and/or RAM 1308 may be non-transitory computer readable mediums and may not include transitory, propagating signals. Any one of the secondary storage 1304, ROM 1306, or RAM 1308 may be referred to as a memory, or these modules may be collectively referred to as a memory. Any of the secondary storage 1304, ROM 1306, or RAM 1308 may be used to store web pages as described herein. The processor 1302 may generate the hyperlinks web pages and store the web pages in memory and/or retrieve the web pages from memory.

The transmitter/receiver 1312 may serve as an output and/or input device of the client 101 and end node 106. For example, if the transmitter/receiver 1312 is acting as a transmitter, it may transmit data out of the computer system 1300. If the transmitter/receiver 1312 is acting as a receiver, it may receive data into the computer system 1300. The transmitter/receiver 1312 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 1312 may enable the processor 1302 to communicate with an Internet or one or more intranets. I/O devices 1310 may include a video monitor, liquid crystal display (LCD), touch screen display, or other type of video display for displaying video, and may also include a video recording device for capturing video. I/O devices 1310 may also include one or more keyboards, mice, or track balls, or other well-known input devices.

It is understood that by programming and/or loading executable instructions onto the computer system 1300, at least one of the processor 1302, the RAM 1308, and the ROM 1306 are changed, transforming the computer system 1300 in part into a particular machine or apparatus, e.g., invoking resources 108, having the novel functionality taught by the present disclosure. It is fundamental to the electrical engineering and software engineering arts that functionality that can be implemented by loading executable software into a computer, which can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally"

with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for authorizing a bilateral session between two websites, comprising:
   a processor; and
   a memory storing executable instructions that when executed by the processor to cause the apparatus to:
   grant authorization for a first website to access a first resource located on a second website and grant authorization for the second website to access a second resource located on the first website;
   transmit access tokens to the first website to permit the first website to access resources of the second website and receive access tokens from the first website for the second website to access resources of the first website; and
   establish the bilateral session between the first website and the second website and identify which of a plurality of resources at each of the first website and the second website are available to share when authorization is granted for the first website to access the first resource and authorization is granted for the second website to access the second resource,
   wherein the bilateral session supports the access of the first resource by the second resource and the access of the second resource by the first resource.

2. The apparatus of claim 1, wherein the first resource and the second resource provide a two-way real-time web application.

3. The apparatus of claim 1, wherein the user provides private information that is used to grant authorization for the first website to access the first resource located on the second website and grant authorization for the second website to access the second resource located on the first website.

4. The apparatus of claim 1, wherein the grant for authorizing the first website to access the first resource located on the second website comprises transmitting an authorization request to the second web site and receiving an authorization response from the second web site.

5. The apparatus of claim 4, wherein the authorization request is Hypertext Transfer Protocol (HTTP) message, and wherein the authorization response is a HTTP message.

6. The apparatus of claim 4, wherein the authorization request provides an access token that corresponds to the second resource to the second website.

7. The apparatus of claim 4, wherein the authorization request provides a first session identifier, and wherein the authorization request provides a second session identifier.

8. The apparatus of claim 4, wherein the authorization request provides a refresh token that corresponds to the second resource, and wherein the refresh token is used to access the second resource once an access token has expired.

9. The apparatus of claim 1, wherein an Open Authorization (OAuth) protocol is used to grant authorization for the first website to access the first resource located on the second website.

10. An apparatus for authorizing a bilateral session between two websites, comprising:
    a processor; and
    a memory storing executable instructions that when executed by the processor to cause the apparatus to:
    transmit an authorization request message to a first website indicating a bilateral session authorization;
    receive an authorization response message from the first website acknowledging the bilateral session authorization;
    transmit access tokens to the first website to permit the first website to access resources of the second website and receive access tokens from the first website for the second website to access resources of the first website;
    establish the bilateral session between the first website and a second website and identify which of a plurality of resources on each of the first website and the second website are available to share using the access tokens after the access has been granted,
    wherein the bilateral session of the first website identifies a list of resources located on the first website, and
    wherein the bilateral session of the second website identifies a list of resources located on the second website.

11. The apparatus of claim 10, wherein the second website modifies by adding a new resource to the list of resources located on the first website.

12. The apparatus of claim 10, wherein the authorization request message requests authorization for the second website to access the list of resources located on the first website.

13. The apparatus of claim 12, wherein the authorization request message provides authorization for the first website to access a second list of resources located on the second website.

14. The apparatus of claim 10, wherein the authorization response message provides a second list of resources located on the second website, and wherein the first website modifies the second list of resources.

15. A method for authorizing a bilateral session between two websites using Open Authorization (OAuth), wherein the method comprises:
- transmitting an authorization request message to a first website;
- receiving an authorization response message from the first website;
- forwarding the authorization response message to a second website;
- transmitting access tokens to the first website to permit the first website to access resources of the second website and receive access tokens from the first website for the second website to access resources of the first website; and
- establishing the bilateral session between the first website and the second website and identify which of a plurality of resources at each of the first website and the second website are available to share when authorization is granted for the first website to access the first resource and authorization is granted for the second website to access the second resource,
- wherein the authorization request represents a request for the first website to grant access to a plurality of first resources located on the first website to the second website,
- wherein the authorization request authorizes the first website to access a plurality of second resources located on the second website, and
- wherein the authorization response message identifies which of the first resources are available for sharing and authorizes the first website to access the first resources.

16. The method of claim 15, wherein the authorization request message comprises an authorization code and a session parameter that identifies the first resources.

17. The method of claim 16 further comprising transmitting an access request message, and wherein the access request message comprises an access token parameter that provides a plurality of access tokens that are associated with the second resources.

18. The method of claim 15, wherein the authorization request message comprises a grant type parameter, an access token parameter, and a expires parameter, wherein the grant type parameter indicates the type of OAuth grant used for authorization, wherein the access token parameter provides a plurality of access tokens that are associated with the second resources, and wherein the expires parameter indicates when the access tokens will expire.

19. The method of claim 18, wherein the authorization request message further comprises a token type parameter that authorizes the session and a refresh token parameter that provides a refresh token when the access token expires.

20. The method of claim 15, wherein the authorization response message comprises a session identifier that identifies the second resources.

* * * * *